United States Patent
Choi et al.

(10) Patent No.: US 8,875,242 B2
(45) Date of Patent: Oct. 28, 2014

(54) METHOD AND APPARATUS FOR HANDLING SECURITY LEVEL OF DEVICE ON NETWORK

(75) Inventors: Hyok-sung Choi, Seoul (KR); Sang-kwon Lee, Suwon-si (KR); Seong-kook Shin, Suwon-si (KR); Se-jun Han, Daejeon Metropolitan (KR); Hee-seok Yu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1150 days.

(21) Appl. No.: 12/413,872

(22) Filed: Mar. 30, 2009

(65) Prior Publication Data

US 2009/0249448 A1    Oct. 1, 2009

Related U.S. Application Data

(60) Provisional application No. 61/040,422, filed on Mar. 28, 2008, provisional application No. 61/040,795, filed on Mar. 31, 2008.

(30) Foreign Application Priority Data

Sep. 22, 2008 (KR) .................. 10-2008-0092943

(51) Int. Cl.
  *G06F 7/04* (2006.01)
  *G06F 15/16* (2006.01)
  *H04L 29/08* (2006.01)
  *H04L 29/06* (2006.01)

(52) U.S. Cl.
  CPC ............ *H04L 63/0815* (2013.01); *H04L 67/14* (2013.01); *H04L 63/10* (2013.01)
  USPC ............................. 726/4; 713/152; 713/168

(58) Field of Classification Search
  CPC ..... H04L 63/0428; H04L 12/58; H04L 29/06; H04L 63/08; H04L 9/3281; H04L 63/0869; H04L 63/101
  See application file for complete search history.

(56) References Cited

U.S. PATENT DOCUMENTS 6,446,069 B1 * 9/2002 Yaung et al. .................. 707/600
6,748,592 B1 * 6/2004 Porter ........................... 718/100

(Continued)

FOREIGN PATENT DOCUMENTS

EP    1 315 064        *   5/2003   ............... G06F 1/00
EP    1 315 064 A1        5/2003

(Continued)

OTHER PUBLICATIONS

Wobber, T.et al, "authorizing application in singularity", Operating systems review ACM USA, Jun. 2007, pp. 355-368, vol. 41, No. 3, The institution of Electrical Engineers, Stevenage, GB, XP 040063536.*

(Continued)

*Primary Examiner* — Fikremariam A Yalew
(74) *Attorney, Agent, or Firm* — Sughrue Mion, PLLC

(57) ABSTRACT

Provided is a method of controlling a security level of a device. The method includes: requesting a server to authenticate a device, wherein the requesting is performed by a second application installed in the device; generating a device-server session for communication between the server and the device, based on the authentication of the device by the server; requesting access to the server by using the generated device-server session, wherein the requesting is performed by a first application installed in the device; and receiving content from the server due to the first application accessing the server.

37 Claims, 12 Drawing Sheets

(56) References Cited

U.S. PATENT DOCUMENTS

| | | | |
|---|---|---|---|
| 7,069,330 B1 | 6/2006 | McArdle et al. | |
| 7,233,997 B1 | 6/2007 | Leveridge et al. | |
| 7,716,475 B2 * | 5/2010 | Asai et al. | 713/166 |
| 7,823,192 B1 * | 10/2010 | Fultz et al. | 726/7 |
| 7,890,770 B2 * | 2/2011 | Kudelski et al. | 713/191 |
| 7,946,473 B2 * | 5/2011 | Kimura et al. | 235/375 |
| 2004/0153635 A1 * | 8/2004 | Kaushik et al. | 712/236 |
| 2007/0124374 A1 * | 5/2007 | Arun et al. | 709/204 |

FOREIGN PATENT DOCUMENTS

| | | | | |
|---|---|---|---|---|
| EP | 1315064 A1 * | 11/2011 | | G06F 1/00 |
| KR | 10-2003-0076745 A | 9/2003 | | |
| KR | 10-0462144 A | 12/2004 | | |

OTHER PUBLICATIONS

Communication dated Jan. 29, 2013 issued by the State Intellectual Property Office of P.R. China in counterpart Chinese Patent Application No. 200910128308.3.

Communication dated Oct. 21, 2013, issued by the State Intellectual Property Office of the People's Republic of China in counterpart Chinese Application No. 200910128308.3.

Communication, dated May 8, 2014, issued by the State Intellectual Property Office of the People's Republic of China in counterpart Chinese Application No. 200910128308.3.

Wobber, T. et al., "Authorizing Applications in Singularity", Operating Systems Review ACM USA, Jun. 2007, pp. 355-368, vol. 41, No. 3, The Institution of Electrical Engineers, Stevenage, GB, XP 040063536.

* cited by examiner

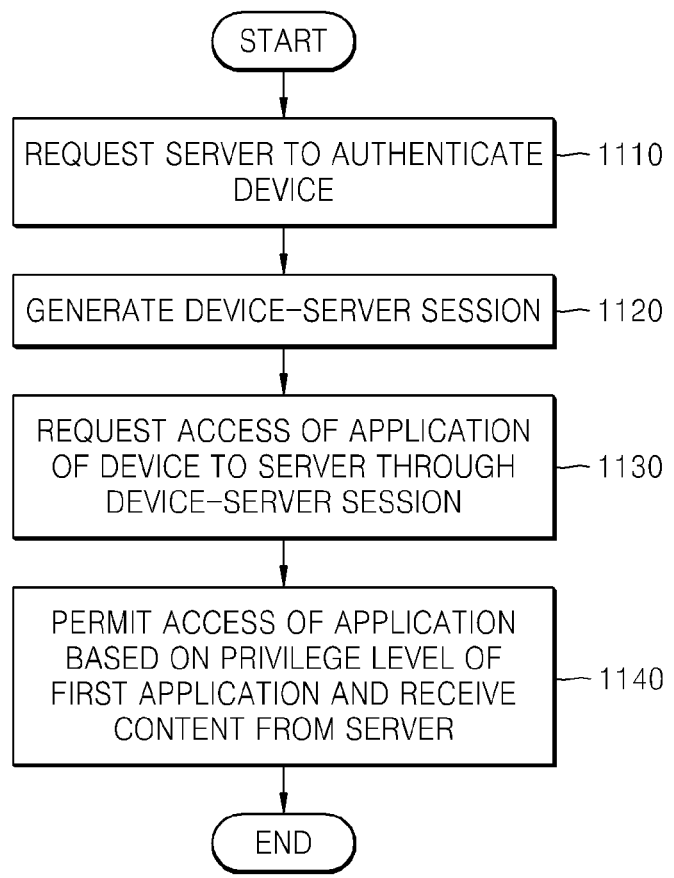

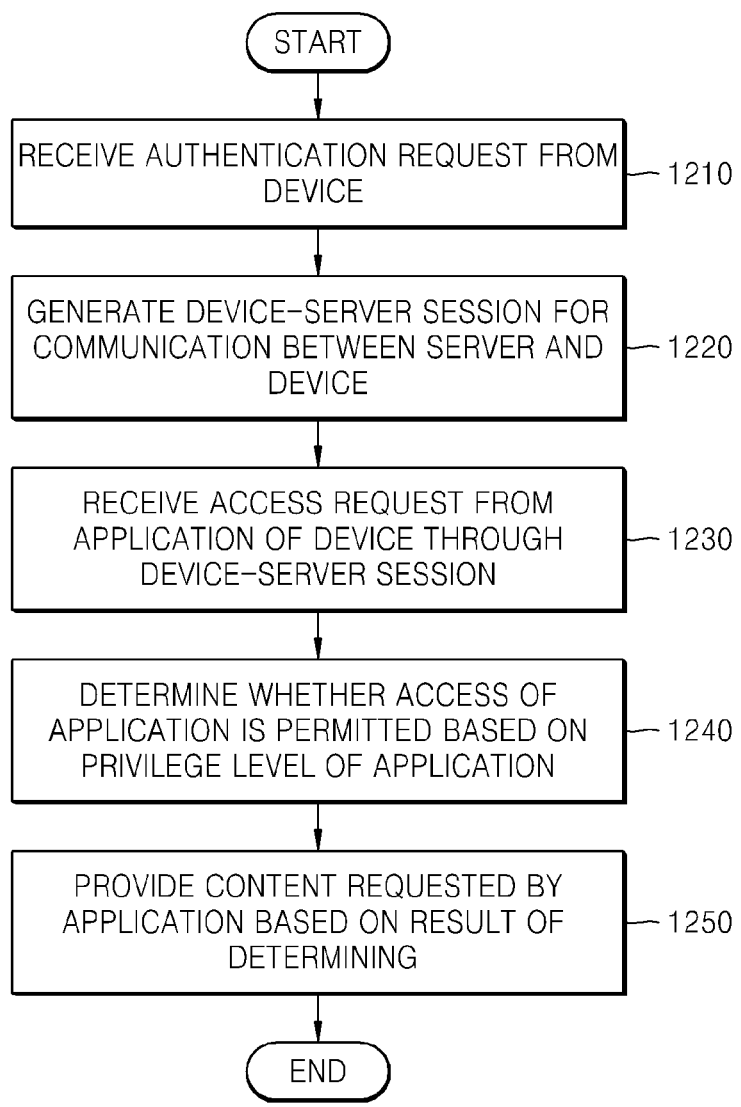

METHOD AND APPARATUS FOR HANDLING SECURITY LEVEL OF DEVICE ON NETWORK

CROSS-REFERENCE TO RELATED PATENT APPLICATION

This application claims the benefits of U.S. Provisional Patent Application Nos. 61/040,422 filed on Mar. 28, 2008, and 61/040,795 filed on Mar. 31, 2008, in the U.S. Patent and Trademark Office, and Korean Patent Application No. 10-2008-0092943, filed on Sep. 22, 2008, in the Korean Intellectual Property Office, the disclosures of which are incorporated herein by reference.

BACKGROUND OF THE INVENTION

1. Field of the Invention

Methods and apparatuses consistent with the present invention relate to network communication between a server and a device in which various applications are installed.

2. Description of the Related Art

As use of the Internet has grown dramatically due to ease of access by using personal computers (PCs), devices that can connect various networks in the Internet have been used to provide various services or content to users. Accordingly, various service providers have transmitted and received services and content of various content developers to and from users over networks, by using these devices.

SUMMARY OF THE INVENTION

Exemplary embodiments of the present invention provide a network communication method and apparatus for handling a security level of a device by considering network communication security.

According to an aspect of the present invention, there is provided a network communication method of a device, in which one or more applications are installed, with a server, the network communication method comprising: requesting the server to authenticate the device, wherein the requesting is performed by a second application installed in the device; generating a device-server session for communication between the server and the device based on the authentication of the device by the server; requesting access to the server through the device-server session, wherein the requesting is performed by a first application installed in the device; and receiving content from the server due to the first application accessing the server.

The receiving of the content may comprise getting permission for the first application to access the server based on a privilege level of the first application. Different privilege levels may be assigned by the server to the one or more applications in consideration of functions and developers of the respective applications.

The applications may have different privilege levels and share key information provided by the server.

The key information may comprise identification information about the developers of the applications.

The requesting of the server to authenticate the device may comprise: requesting the server to authenticate the device by using the second application installed in the device; and transmitting session request information comprising key information of the second application and device identification information.

The generating of the device-server session may comprise: receiving session permission information comprising a session seed key from the server, based on the session request information; and generating a device session token by using the received session seed key and an encryption key of the device, wherein the device session token is shared by the applications, and if the device session token corresponds to a server session token of the server, the first application is permitted to the server through the device-server session.

The requesting to access the server may comprise requesting to access the server through the device-server session by using the device session token, wherein the requesting is performed by the first application.

The receiving of the content may comprise, if a higher privilege level of a privilege level of the first application and a maximum permitted privilege level of the device-server session is higher than or equal to a required privilege level of the requested content, receiving the requested content from the server.

The requesting to access the server may comprise requesting access to a predetermined application programming interface (API) of the server, wherein the requesting is performed by the first application, wherein the receiving of the content comprises: if a higher privilege level of a privilege level of the first application and a maximum permitted privilege level of the device-server session is higher than or equal to a required privilege level of the predetermined API, getting permission for the first application to access the predetermined API; and receiving content based on an attribute of the device by using the predetermined API.

The receiving of the content may comprise receiving content in consideration of an attribute of the device from the server through the device-server session, wherein the receiving is performed by the first application.

The requesting of the server to authenticate the device may comprise requesting the server to authenticate the device in consideration of an user of the device by using user identification information of the user, wherein the generating of the device-server session comprises generating a device-server session based on the user identification information, wherein the user identification information is at least one of user identification information stored in the device and user identification information of the device which is received from the server.

The generating of the device-server session may comprise generating a device-server session based on the user identification information.

The requesting of the server to authenticate the device may comprise transmitting a user password.

The requesting to access the server may comprise requesting access to a user database of the server through the device-server session, wherein the requesting is performed by the first application, wherein the receiving of the content comprises getting permission for the first application to access the user database of the server and receiving predetermined content, based on a privilege level of the first application, the user identification information, and service provider key information of the first application.

The requesting to access server may comprise: remotely accessing the device through a web interface by using web identification information of the device; and requesting access to the user database of the server through the device-server session by using the web interface, wherein the requesting is performed by the first application.

According another aspect of the present invention, there is provided a network communication method of a server, which is used to communicate with a device in which one or more applications are installed, the network communication method comprising: receiving an authentication request of a second application installed in the device which requests the server to authenticate the device; generating a device-server session for communication between the server and the device based on the authentication of the device by the server; receiving an access request of a first application installed in the device which requests access to the server through the device-server session; and providing content requested by the first application due to the first application accessing the server.

The providing of the content may comprise: determining whether the first application is permitted to access the sever based on a privilege level of the first application; and providing content requested by the first application, based on a result of the determining.

The network communication method may further comprise, if it is determined that the first application is permitted to access the server, providing content requested by the first application.

The network communication method may further comprise assigning different privilege levels to the one or more applications installed in the device in consideration of functions and developers of the respective applications.

The network communication method may further comprise providing key information comprising privilege levels and developer identification information of the respective applications to the respective applications.

The receiving of the authentication request may comprise: receiving the authentication request of the device from the second application installed in the device; and receiving session request information comprising at least one of key information of the second application, version information of the second application, and device identification information.

The generating of the device-server session may comprise determining a maximum permitted privilege level of the device-server session, based on the session request information.

The generating of the device-server session may comprise: determining an encryption key of the server by using the version information of the second application; generating a session seed key for the device-server session; and generating a server session token by using the session seed key and the encryption key of the server.

The generating of the device-server session may comprise storing in a database of the server device-server session identification information comprising at least one of the server session token, the device identification information, user identification information, expiration date information of the device-server session, and a maximum permitted privilege level of the device-server session based on a required privilege level of the requested content.

The generating of the device-server session may comprise transmitting session permission information comprising the session seed key and expiration date information of the device-server session to the device.

The providing of the content may comprise: comparing a device session token of the first application with the server session token; and determining whether the first application is permitted access through the device-server session is permitted, based on a result of the comparing, wherein the device session token of the first application is generated by using the session seed key and the encryption key of the device from session permission information received by the device, and is shared by the applications of the device.

The generating of the device-server session may comprise searching for a privilege level of the first application based on key information of the first application, wherein the determining of whether the first application is permitted to access the server comprises, if a higher privilege level of a privilege level of the first application and a maximum permitted privilege level of the device-server session is higher than or equal to a required privilege level of the requested content, permitting the first application access.

The receiving of the access request may comprise receiving a request from the first application to access a predetermined API of the server, wherein the generating of the device-server session comprises searching for a privilege level of the first application based on the key information of the first application, wherein the determining of whether the first application is permitted access comprises, if a higher privilege level of a privilege level of the first application and a maximum permitted privilege level of the device-server session is higher than or equal to a required privilege level of the predetermined API, permitting the first application access to the predetermined API.

The network communication method may further comprise storing in the database of the server a device user list comprising user identification information of the device.

The generating of the session may comprise generating the device-server session in consideration of the user identification information of the device.

The session identification information may comprise the user identification information.

The generating of the device-server session may comprise generating the device-server session in consideration of user identification information of the device, wherein the receiving of the access request comprises receiving a request from the first application to access a user database of the server through the device-server session, wherein the requesting is performed by the first application, wherein the determining of whether the access is permitted comprises permitting the first application to access the user database of the server, based on a privilege level of the first application, the user identification information, and service provider key information of the first application, wherein the request to access the user database of the server is at least one of direct access request through the device and a remote access request using a web interface.

According to another aspect of the present invention, there is provided a network communication apparatus of a device, which is used to communicate with a server, wherein one or more applications are installed in the device, the network communication apparatus comprising: a device authentication requesting unit getting a second application installed in the device to request the server to authenticate the device; a device session generating unit generating a device-server session for communication between the server and the device based on authentication by the server; an application access requesting unit getting a first application installed in the device to request access to the server through the device-server session; and a content receiving unit receiving content from the server due to the first application accessing the server.

The content receiving unit may get the first application to be permitted to access the server based on a privilege level of the first application.

Different privilege levels may be assigned to the one or more applications by the server in consideration of functions and developers of the respective applications.

If a higher privilege level of a privilege level of the first application and a maximum permitted privilege level of the device-server session is higher than or equal to a required privilege level of the requested content, the content receiving unit may receive the requested content from the server.

The content receiving unit may receive content in consideration of an attribute of the device from the server.

The device authentication requesting unit may request authentication of the device in consideration of a user of the device by using user identification information of the user, and the user identification information may be at least one of user identification information stored in the device and user identification information of the device received from the server.

The application access requesting unit may comprise: a remote access receiving unit receiving remote access of the device by using web identification information of the device through the web interface; and a remote user database access requesting unit requesting access of the first application to a user database of the server through the device-server session.

According to another aspect of the present invention, there is provided a network communication apparatus of a server, which is used to communicate with a device in which one or more applications are installed, the network communication apparatus comprising: a device authentication request receiving unit receiving an authentication request from a second application installed in the device which requests the server to authenticate the device; a server session generating unit generating a device-server session for communication between the server and the device based on authentication of the device by the server; an application access request receiving unit receiving an access request from a first application installed in the device which requests access to the server through the device-server session; and a content providing unit providing content requested by the first application due to the first application accessing the server.

The content providing unit may determine whether the first application is permitted to access the server is permitted based on a privilege level of the first application, and provide content requested by the first application based on a result of the determining.

The network communication apparatus may further comprise an application privilege level determining unit assigning different privilege levels to the one or more applications in consideration of functions and developers of the respective applications.

The server session generating unit may comprise an application privilege level searching unit searching for a privilege level of the first application, wherein the application access permission determining unit may comprise, if a higher privilege level of the privilege level of the first application and a maximum permitted privilege level of the device-server session is higher than or equal to a required privilege level of the requested content, permitting the access of the first application.

The network communication apparatus may further comprise a device user list storing unit storing in a database of the server a device user list comprising user identification information of the device.

According to other aspects of the present invention, there are provided computer-readable recording media having embodied thereon programs for executing the network communication methods of communicating between a server and a device over a network.

According to another aspect of the present invention, there is provided a network communication method of a device, which is used to communicate with a server, wherein one or more applications are installed in the device, the network communication method comprising: generating a session for communication between the server and the device by using a second application installed in the device; getting a first application installed in the device to use the session based on a privilege level of the first application; and receiving predetermined content from the server based on the privilege level of the first application accessing the server by using the session, wherein privilege levels of the one or more applications are rights reserved by the applications to access the server.

The generating of the session may comprise generating the session based on a privilege level of the second application that requests the server to authenticate the device.

According to another aspect of the present invention, there is provided a network communication method of a server, which is used to communicate with a device in which one or more applications are installed, the network communication method comprising: generating a session for communication between the server and the device by using a second application installed in the device; receiving an access request of a first application installed in the device which requests access to the server through the session, based on a privilege level of the first application; and determining whether predetermined content is provided to the first application based on the privilege level of the first application, wherein privilege levels of the one or more applications are rights reserved by the applications to access the server.

The generating of the session may comprise generating the session based on a privilege level of the second application that requests the server to authenticate the device.

According to another aspect of the present invention, there is provided a network communication method of a device, which is used to communicate with a server, wherein one or more applications are installed in the device, the network communication method comprising: generating a token so as for a second application installed in the device to access the server; sharing the generated token with the one or more applications; requesting access of a first application, which is installed in the device, to the server by using the shared token; and receiving content requested by the first application from the server due to the first application accessing the server.

The generating of the token may comprise requesting the server to authenticate the device, wherein the requesting is performed by the second application; and generating a token indicating that the device authenticated by the server accesses the server.

According to another aspect of the present invention, there is provided a network communication method of a device, which is used to communicate with a server, wherein one or more applications are installed in the device, the network communication method comprising: generating a session for communication between the server and the device by using a second application installed in the device; getting a first application installed in the device to use the session based on key information of the first application; and receiving predetermined content from the server based on the key information of the first application that accesses the server by using the session, wherein application key information of an application corresponds to a privilege level of the application, and privilege levels of the one or more applications are rights reserved by the applications to access the server.

The generating of the session may comprise generating the session based on key information of the second application that requests the server to authenticate the device.

According to another aspect of the present invention, there is provided a network communication method of a server, which is used to communicate with a device in which one or more applications are installed, the network communication method comprising: generating a session for communication between the server and the device based on key information of a second application installed in the device; receiving an access request of a first application installed in the device which requests access to the server through the session based key information of the first application; and determining whether predetermined content is provided to the first application based on the key information of the first application, wherein application key information of an application corresponds to a privilege level of the application, and privilege levels of the one or more applications are rights reserved by the respective applications to access the server.

The generating of the session may comprise generating the session based on the key information of the second application that requests the server to authenticate the device.

BRIEF DESCRIPTION OF THE DRAWINGS

The above and other features of the present invention will become more apparent by describing in detail exemplary embodiments thereof with reference to the attached drawings in which:

FIG. 11 is a flowchart illustrating a network communication method of a server, which is used to communicate with a device, according to an embodiment of the present invention; and FIG. 12 is a flowchart illustrating a network communication method of a device, which is used to communicate with a server, according to an embodiment of the present invention.

DETAILED DESCRIPTION OF THE INVENTION

Exemplary embodiments of present invention will now be described more fully with reference to the accompanying drawings, in which exemplary embodiments of the invention are shown.

Figure 1:
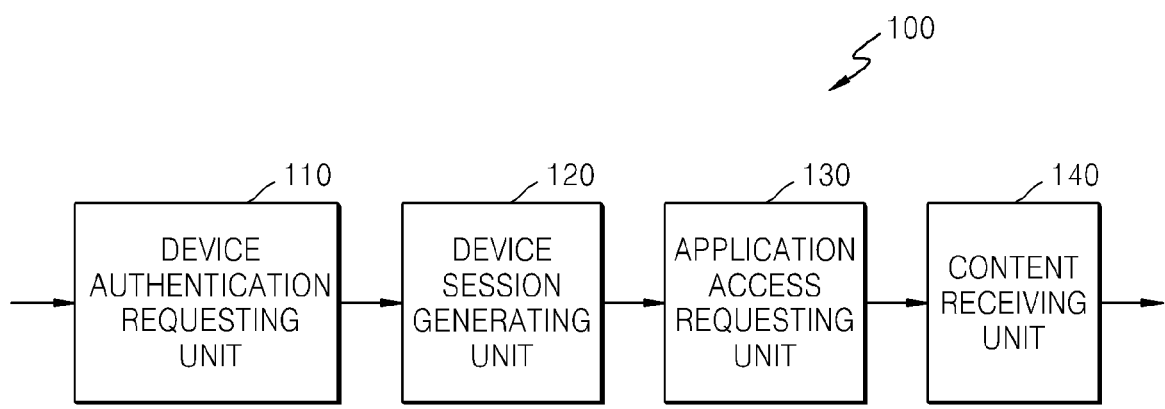
FIG. 1 is a block diagram of a network communication apparatus of a device, which is used to communicate with a server, according to an embodiment of the present invention.

FIG. 1 is a block diagram of a network communication apparatus 100 of a device, which is used to communicate with a server, according to an embodiment of the present invention.

The network communication apparatus 100 includes a device authentication requesting unit 110, a device session generating unit 120, an application access requesting unit 130, and a content receiving unit 140.

In network communication between the device and the server, the device may be connected to a network and may transmit and receive data or content from another entity over the network. The device may be an Internet protocol television (IPTV), and may receive a broadcast from another entity using an Internet protocol (IP) or transmit data or content for data broadcast services. Also, the server is connected to the network to control and manage data communication between other entities.

One or more applications are installed in the device, and examples of the applications include an operating system (OS), firmware, a widget, a widget engine, and a widget browser. Different privilege levels are assigned to the one or more applications in consideration of functions and developers of the respective applications. For example, privilege levels are security levels to authenticate the applications in a network environment between the server and the device, and may be determined in consideration of functions and developers of the applications.

Each of the applications may have key information received from the server, and a privilege level of the application may be included in the key information. The key information may also include identification information about a developer of the application. The privilege level and the key information will be explained later with reference to FIGS. 4 through 10.

The device authentication requesting unit 110 requests the device to access the server in order to communicate between the server and the device. The device authentication requesting unit 110 may request the server to authenticate the device by using an application installed in the device. The application used to request the server to authenticate the device must have a privilege level of a predetermined value or more. The authentication or access request regarding the application may be performed by calling predetermined data or content from the server.

If the device is authenticated by the server as a response to the request of the device authentication requesting unit 110, the device session generating unit 120 generates a device-server session for communication between the server and the device.

In order to generate the device-server session, the device authentication requesting unit 110 may include a session request information transmitting unit that transmits session request information of the application in order to request the server to authenticate the device. The session request information may include key information and device identification information.

The server receiving the session request information of the device generates a device-server session and transmits session permission information including some session-related information to the device. The device session generating unit 120 includes a session permission information receiving unit (not shown) receiving from the server the session permission information including a session seed key that is generated based on the session request information, and also includes a device session token generating unit (not shown) generating a device session token by using the received session seed key and an encryption key of the device.

As a session token is generated, a device-server session is generated. The session token is generated by each of the device and the server. The device session token is shared by all the applications installed in the device. If the device session token corresponds to a server session token, the application may be allowed to access the server through the device-server session. A method of generating the device-server session and the session token will be explained later with reference to FIG. 6.

The application access requesting unit 130 requests the application, which is installed in the device, to access the server through the device-server session generated by the device session generating unit 120 so that the application can use content of the server. The application access requesting unit 130 may request the access of the application to the server through the device-server session by using the device session token.

If the application is permitted by the server to access the server based on a privilege level of the application, the content receiving unit 140 receives the content from the server. If the access of the application to the server is permitted by the server, the content receiving unit 140 may receive the content in consideration of an attribute of the device from the server through the device-server session.

If a higher privilege level of the privilege level of the application and a maximum permitted privilege level of the device-server session is higher than or equal to a required privilege level of the requested content, the content receiving unit 140 may receive the requested content from the server.

For example, the application may request access to an application program interface (API) of the server. The application access requesting unit 130 may further include an API access requesting unit (not shown) that requests the application to access a predetermined API of the server. If a higher privilege level of a privilege level of the application and a maximum permitted privilege level of the device-server session is higher than or equal to a required privilege level of the predetermined API, the application is permitted by the server to access the predetermined API and the application having accessed the predetermined API may receive content based on an attribute of the device by using the predetermined API.

Although the network communication apparatus 100 of FIG. 1 communicates between the server and the device based on device identification, the present invention is not limited thereto and the communication between the server and the device may be performed based on device identification and user identification according to another embodiment. That is, the communication between the server and the device is performed by identifying a user by using a predetermined device. The server may store a user database.

According to the another embodiment, the device authentication requesting unit 110 may request the server to authenticate the device in consideration of a user of the device by using user identification information about the user. The user identification information may be at least one of user identification information stored in the device and user identification information of the device which is received from the server. The device authentication requesting unit 110 may include a user password transmitting unit (not shown) that transmits a user password.

The device session generating unit 120 may generate a device-server session based on the user identification information.

The application access requesting unit 130 may include a user database access requesting unit (not shown) that requests access of the application to the user database of the server through the device-server session.

The access of the application to the user database of the server may be permitted based on a privilege level of the application, user identification information, and service provider key information of the application, and the content receiving unit 140 may receive content from the server.

The application access requesting unit 130 may include a remote access receiving unit (not shown) for remote access via a web interface. If web identification information of the device selected by a remote user is recognized by the server via the web interface, the remote access is permitted. Also, the application access requesting unit 130 may include a remote user database access requesting unit (not shown) that requests the application to access the user database of the server through the device-server session by using the web-interface. The remote access to the user database will be explained later with reference to FIG. 10.

Figure 2:
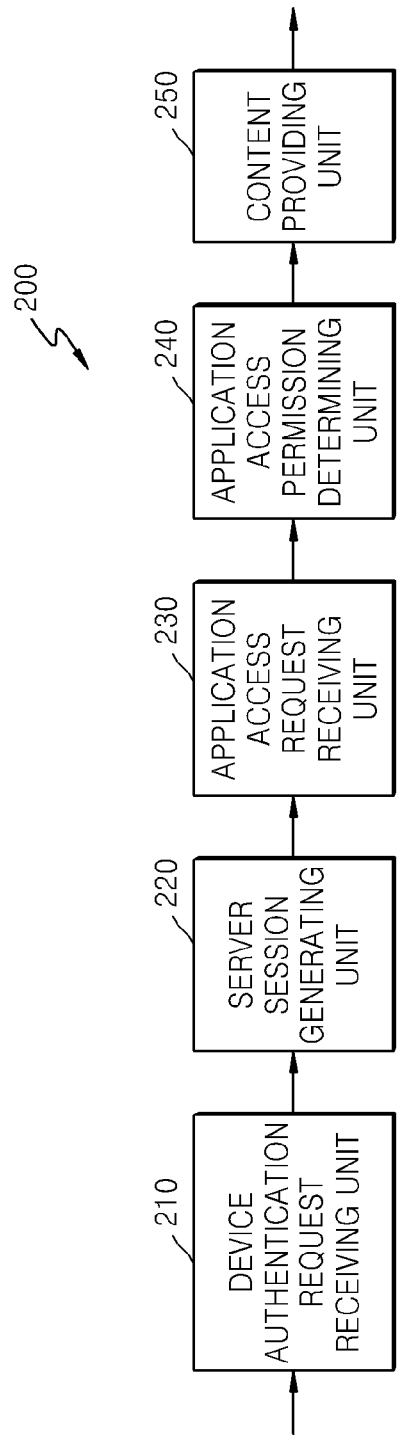
FIG. 2 is a block diagram of a network communication apparatus of a server, which is used to communicate with a device, according to an embodiment of the present invention.

FIG. 2 is a block diagram of a network communication apparatus 200 of a server, which is used to communicate with a device, according to an embodiment of the present invention.

The network communication apparatus 200 includes a device authentication request receiving unit 210, a server session generating unit 220, an application access request receiving unit 230, an application access permission determining unit 240, and a content providing unit 250.

The device authentication request receiving unit 210 receives an authentication request of the device that requests the server to authenticate the device for network communication between the server and the device. The server session generating unit 220 generates a device-server session based on the authentication request of the device received by the device authentication request receiving unit 210. The access request receiving unit 230 receives an access request of an application installed in the device which requests access to the server through the device-server session generated by the server session generating unit 220.

The application access permission determining unit 240 determines whether the access of the application is permitted based on a privilege level of the application. The content providing unit 250 provides content requested by the application based on a result of the determining.

The network communication apparatus 200 may further include an application privilege level determining unit (not shown) that assigns different privilege levels to applications to be installed in the device in consideration of functions and developers of the respective applications.

The network communication apparatus 200 may further include an application key information providing unit (not shown) that provides key information including privilege levels and developer identification information of the respective applications to the respective applications. Accordingly, although a privilege level of an application is not directly provided by the application or the device, the server may search for the privilege level of the application in a database of the server by using key information of the application.

The device authentication request receiving unit 210 may include a session request information receiving unit (not shown) that receives the authentication request of the device from the application installed in the device and receives session request information including at least one of key information of the application, version information of the application, and device identification information.

The server session generating unit 220 may include a content required privilege level determining unit (not shown) that determines a maximum permitted privilege level of the device-server session, based on the received session request information. For example, the maximum permitted privilege level of the device-server session may be determined based on the version information of the application.

The server session generating unit 220 may further include a server session token generating unit (not shown) that generates a server session token. The server session token generating unit may determine an encryption key of the server by using the version information of the application, generate a session seed key for the device-server session, and generate a server session token by using the session seed key and the encryption key of the server.

The server session generating unit 220 may further include a session identification information storing unit (not shown) that stores in the database of the server device-server session identification information including information about the generated device-server session. For example, the device-server session identification information may include at least one of a server session token, device identification information, user identification information, expiration date information of the device-server session, and a maximum permitted privilege level of the device-server session. The maximum permitted privilege level of the device-server session may be determined based on a required privilege level of requested content.

The server session generating unit 220 may further include a session permission information transmitting unit (not shown) that transmits session permission information including the session seed key and the expiration date information of the device-server session to the device.

The application access permission determining unit 240 may further include a session token comparing unit (not shown) that compares and determines whether the server session token corresponds to a device session token of the application. The session token comparing unit determines whether the application is permitted access through the device-server session if it is determined that the server session token corresponds to the device session token.

The server session generating unit 220 may further include an application privilege level searching unit (not shown) that searches for a privilege level of the application based on key information of the application. The application access permission determining unit 240 may further include a privilege level comparing unit (not shown) that permits the application access if a higher privilege level of a privilege level of the application and a maximum permitted privilege level of the device-server session is higher than or equal to a required privilege level of the requested content.

The application access request receiving unit 230 may include an API access request receiving unit (not shown) that receives a request from the application to access a predetermined API of the server. The application access permission determining unit 240 may further include an API access permission determining unit (not shown) that permits the application to access the predetermined API if a higher privilege level of a privilege level of the application and a maximum permitted privilege level of the device-server session is higher than or equal to a required privilege level of the predetermined API.

Although the network communication apparatus 200 of FIG. 2 communicates between the server and the device based on device identification, the present invention is not limited thereto and the communication between the server and the device may be performed based on device identification and user identification according to another embodiment. According to the another embodiment, the network communication apparatus 200 may further include a device user list storing unit (not shown) that stores in the database of the server a device user list including user identification information of the device.

The server session generating unit 220 may generate a device-server session in consideration of the user identification information of the device, and the session identification information storing unit may further include the user identification information in addition to the session identification information.

The application access request receiving unit 230 may include a user database access request receiving unit (not shown) that receives a request from the application to access the user database of the server through the device-server session. The application access permission determining unit 240 may include a user database access permission determining unit (not shown) that permits the predetermined application to access the user database of the server, based on service provider key information of the predetermined application and user identification information. The request to access the user database may be at least one of a direct access request through the device and a remote access request using a web interface.

Figure 3:
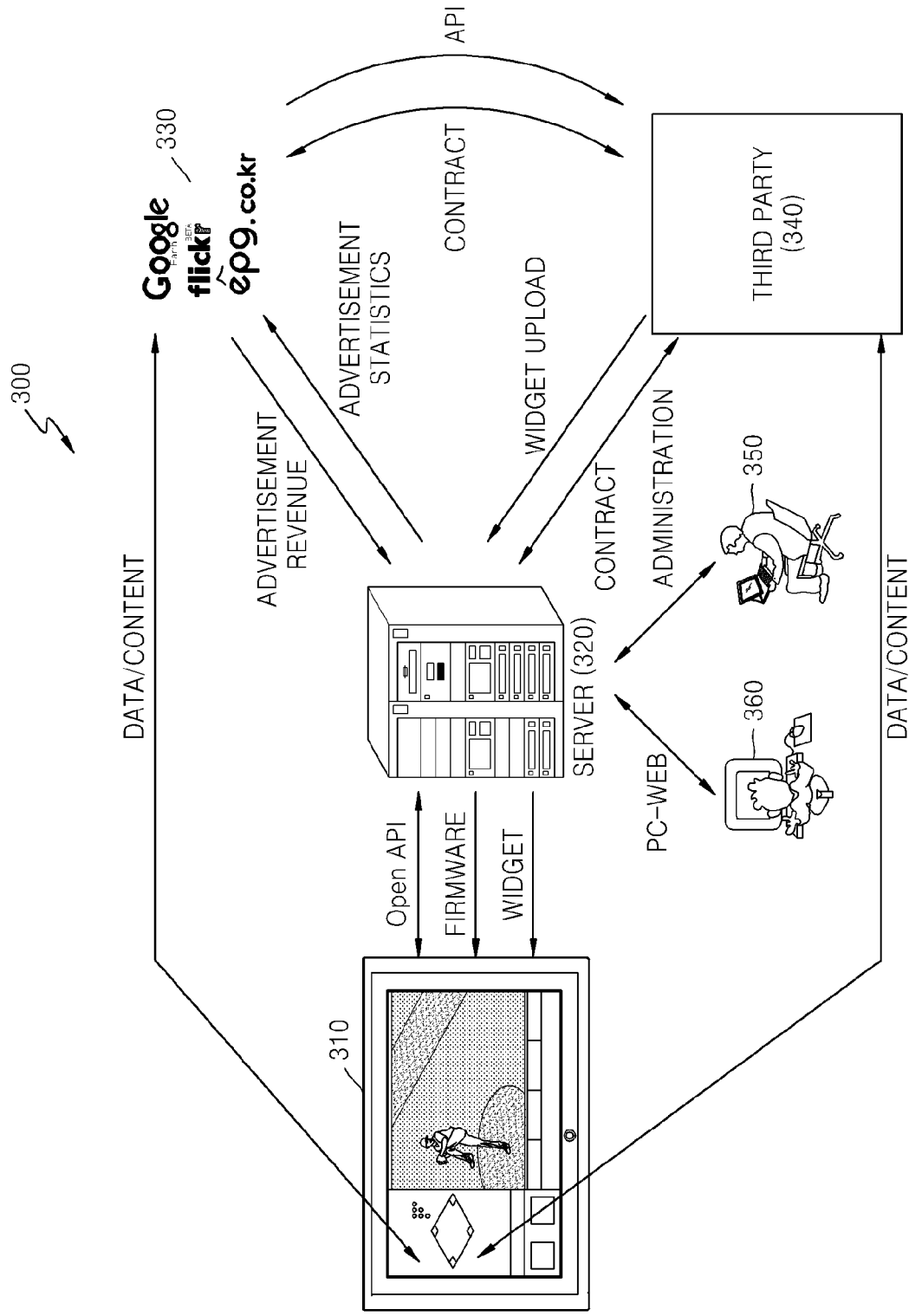
FIG. 3 illustrates a relationship between communication entities in a network environment in which the network communication apparatuses of FIGS. 1 and 2 are used.

FIG. 3 illustrates a relationship between communication entities in a network environment in which the network communication apparatuses 100 and 200 of FIGS. 1 and 2 are used. It is assumed for convenience that a device 310 for communicating with a server 320 over a network is an IPTV.

In an IPTV network 300, the device 310 transmits and receives data or content to and from service providers 330, such as Yahoo and Google, and transmits and receives data and content to and from a third party 340 that develops and provides applications.

In order to smoothly provide IP services to the device 310, the server 320 provides applications, such as firmware and a widget, to the device 310. Also, the server 320 shares an open API with the device 310. In order to manage and control data or content transmission and reception regarding the device 310, the server 320 or a server administrator 350 may store information related to data, content, and applications provided to the device 310, and control privileges about the data, content, and applications.

Service providers 330 provide advertisement revenues, which are obtained by providing commercial advertisement services to the device 310, to the server 320. The server 320 may provide valuable information, such as various statistical data including advertisement statistics received from the device 310, to the service providers 330. Due to a contract between the server 310 and the third party 340, the third party 340 provides a widget, which can be executed on the device 310, to the server 320.

The service providers 330 and the third party 340 may share an API for application development of the third party 340 through a contract therebetween. Although the service providers 330 and the third party 340 are separate entities in FIG. 3, the present invention is not limited thereto and the service providers 330 and the third party 340 may be the same such that the service providers 330 or the third party 340 may develop and distribute widgets.

Privilege levels assigned by the server 320 to the data, content, or applications which are provided to the device 310 by the service providers 330 and the third party 340 may be determined by conditions of a contract between the server 320, the service providers 330, and the third party 340.

A user 360 of the device 310 may manage information about the device 310 and remotely control the device 310 by being connected to the server 320 via a PC-web interface.

Figure 4:
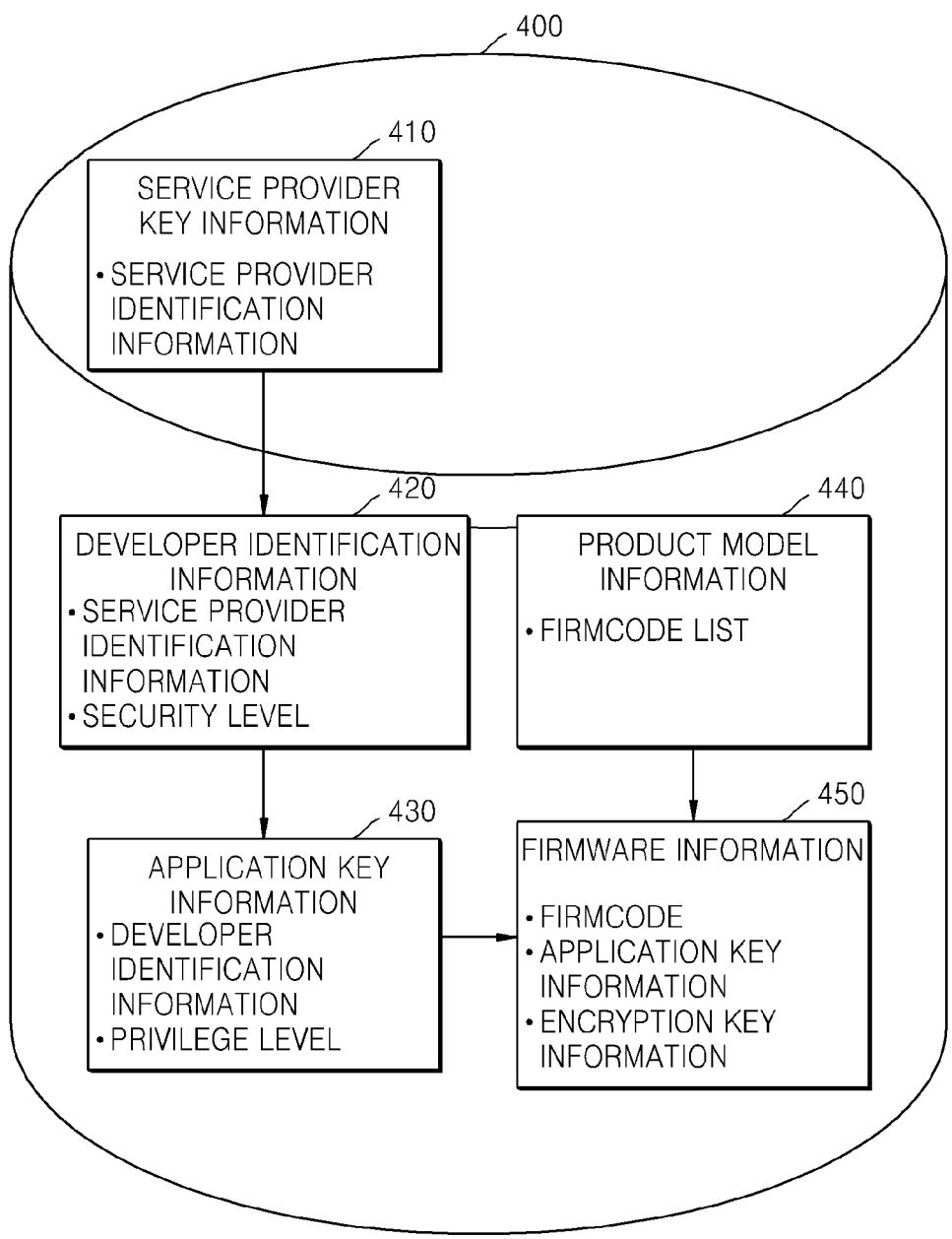
FIG. 4 illustrates a database of a server, according to an embodiment of the present invention.

FIG. 4 illustrates a database 400 of a server, according to an embodiment of the present invention.

In order for the server to manage data and content communication of a device, information related to applications installed in the device is stored in the database 400 of the server. Service provider key information 410, developer information 420, application key information 430, product model information 440, and firmware information 450 are stored in the database 400.

The service provider key information 410 includes service provider identification information, and the developer identification information 420 includes information about a security level that is assigned to a developer by the server and service provider identification information of a service provider related to the developer. The application key information 430 includes the developer identification information 420 and information about a privilege level that is assigned to an application. The product model information 440 includes information about a firmcode list. The firmware information 450 includes information about firmcode, the application key information 430, and encryption key information. The firmcode indicates a version of firmware.

The information about the privilege level of the application key information 430 is used to determine whether an application is permitted to access the server. The server may determine a privilege level of the application that requests to access the server by checking application key information of the application and searching for the application key information 430 stored in the database 400 of the server. The application key information 430 may be set as universally unique identifier (UUID) information.

The information about the firmcode, the application key information 430, and the encryption information of the firmware information 450 are used to generate a device-server session. If an application that requests the server to authenticate the server is firmware, the server may obtain the information about the firmcode, the application key information 430, and the encryption information by checking and searching for the firmware information 450 stored in the database 400 of the server.

Since the server can search for and extract detailed information about the device and applications by using information about the device and the applications stored in its database, a storage burden on the device can be reduced.

Since the server can manage identification information about various service providers and developers, product model information, firmware and firmware version information, security levels and privilege levels can be controlled according to functions of applications and service providers and developers.

Figure 5:
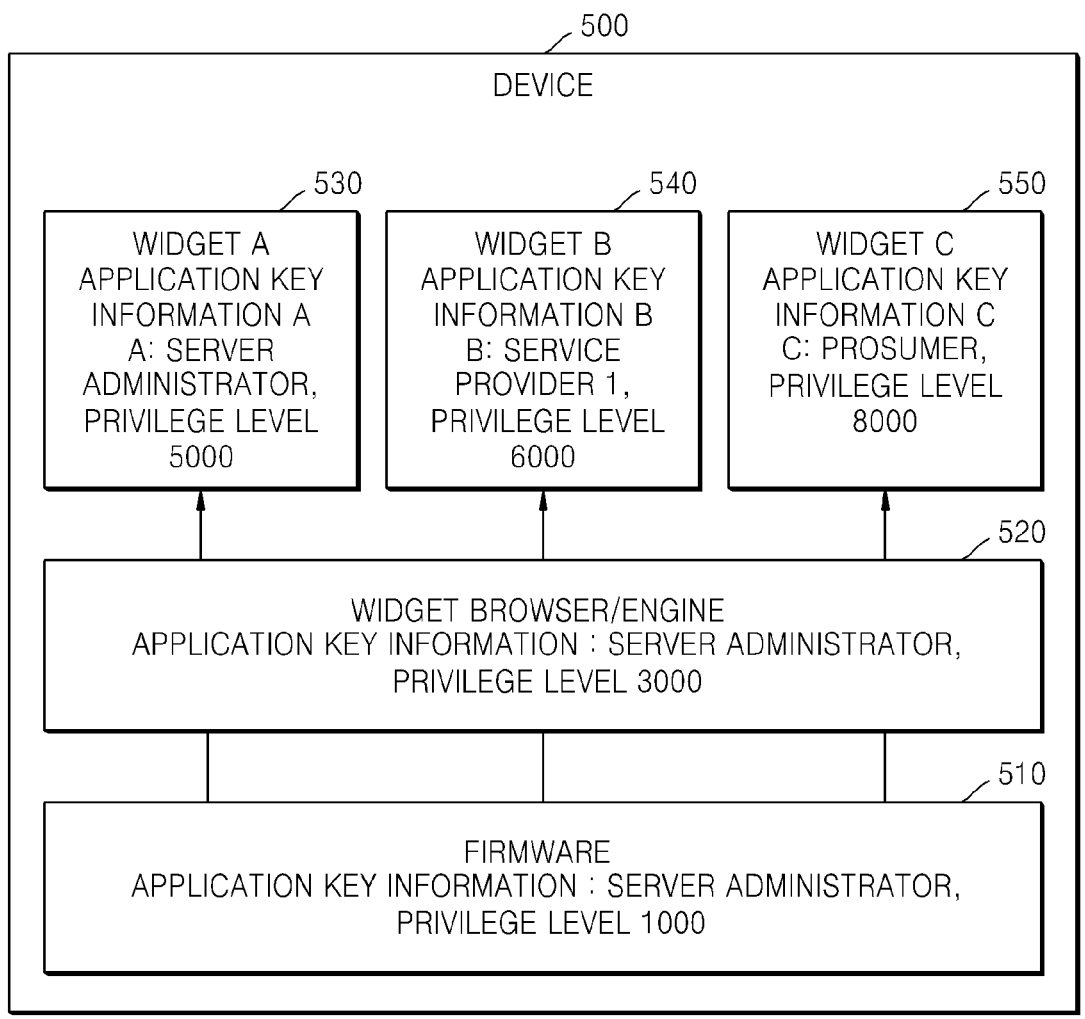
FIG. 5 illustrates a device in which applications are installed, according to an embodiment of the present invention.

FIG. 5 illustrates a device 500 in which applications are installed, according to an embodiment of the present invention.

One or more applications may be installed in the device 500, and may be created by service providers, a third party, a server, or individual users. Examples of the applications may include firmware 510, a widget browser (or widget engine) 520, and widgets 530, 540, and 550.

The firmware 510, which is a device OS, may be provided by the server or a server administrator. Application key information of the firmware 510 includes as developer identification information identification information about the server or the server administrator and information about a privilege level assigned to the firmware 510.

Application key information of the widget browser 520, which is system middleware, includes as developer identification information identification information about the server or the server administrator and information about a privilege level assigned to the widget browser 520.

The widget A 530, the widget B 540, and the widget C 550, each of which is system software, may be provided by the server or the server administrator, the service providers, or the third party such as a prosumer (combination of producer/consumer) or individual developers. For example, application key information A, B, and C of the widget A 530, the widget B 540, and the widget C 550 may include as developer identification information identification information about the server or the server administrator, identification information about a service provider 1, and identification information about a prosumer, respectively. Also, the application key information A, B, and C of the widget A 530, the widget B 540, and the widget C 550 may further respectively include privilege levels.

In FIG. 5, it is assumed that as the number indicating a privilege level of an application decreases, the privilege level increases and an access privilege to the server increases. In general, since the firmware 510 is the device OS, a greater server access privilege is assigned to the firmware 510 and less server access privileges are assigned to the widget A 530, the widget B 540, and the widget C 550.

Although each of the widget A 530, the widget B 540, and the widget C 550 is system software, different privilege levels are assigned to the widget A 530, the widget B 540, and the widget C 550 according to developers and privilege levels assigned to the developers. For example, a server access privilege may increase in the order of the widget A 530 developed and provided by the server or the server administrator, the widget B 540 provided by the service provider 1, and the widget C 550 provided by the prosumer. Accordingly, applications calling an open API have various privilege levels.

Accordingly, whether to permit each application to access the open API may be determined based on application key information of the application. Also, whether to permit the access may be dynamically controlled based on an API access rule of the server, and security levels and privilege levels of entities such as a third party, service providers, and the server. Accordingly, robustness to hacking, and prevention of cracking and attempts to obtain private information stored in the server can be secured.

Figure 6:
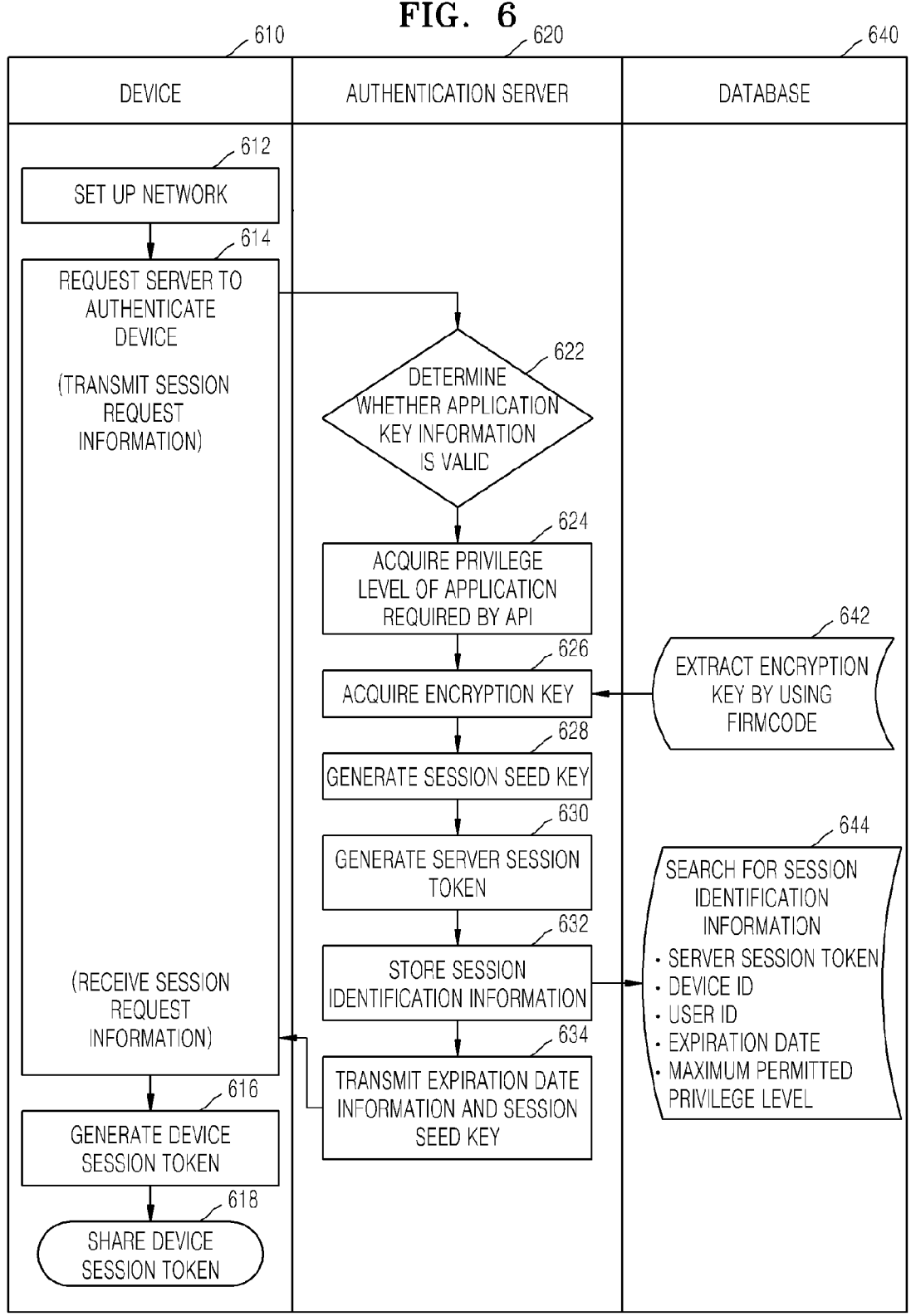
FIG. 6 is a flowchart illustrating a method used by a server to authenticate a device, according to an embodiment of the present invention.

FIG. 6 is a flowchart illustrating a method used by a server to authenticate a device 610, according to an embodiment of the present invention.

In operation 612, the device 610 sets up a network for communication with the server. For example, the setting up of the network may be performed by using a dynamic host configuration protocol (DHCP).

In order for the server to authenticate the device 610, a device-server session for communication between the server and the device 610 must be generated. In operation 614, the device 610 transmits session request information to the server in order to request the server to provide information required to generate the device-server session. For example, the session request information may be transmitted by the session request information transmitting unit of the device authentication requesting unit 110 of the network communication apparatus 100 of FIG. 1. The session request information may include application key information of an application that requests the server to authenticate the device, device identification information, information about firmcode of the application, and so on.

In operation 622, the server or an authentication server 620 receives the session request information, and determines whether the application key information of the session request information is valid. For example, the session request information may be received by the device authentication request receiving unit 210 of the network communication apparatus 200 of FIG. 2.

In operation 624, the server or the authentication server 620 searches for and acquires a privilege level (referred to as an API required privilege level) of the application which is required by an API of the server to authenticate the device. For example, the API required privilege level may be searched for and acquired by the server session generating unit 220 of the network communication apparatus 200 of FIG. 2.

In operation 626, the server or the authentication server 620 acquires an encryption key by using the received information about the firmcode. In operation 628, the server or the authentication server 620 generates a session seed key. In operation 630, the server or the authentication server 620 generates a server session token by using the encryption key and the session seed key. In operation 642, firmcode corresponding to a database 640 of the server is searched for and extracted by using the received information about the firmcode. Each of the session seed key and the server session token may be generated in a preset manner. For example, the session seed key may be determined by a random function, and the server session token may be generated by a message-digest algorithm 5 (MD5) hash function. For example, the encryption key, the session seed key, and a server session may be generated by the server session generating unit 220 of the network communication apparatus 200 of FIG. 2.

In operation 644, the server or the authentication server 620 searches for session identification information in the database 640. In operation 632, the server or the authentication server 620 stores in the session identification information of the database the received device identification information, the generated server session token, information about an expiration date of a privilege level assigned to the application, and the API required privilege level. When user identification information is used in addition to the application key information in order to authenticate the device, the user identification information may be included in the session identification information. For example, the session identification information 644 may be stored in the database 640 of the server by the session identification information storing unit of the server session generating unit 220 of the network communication apparatus 200 of FIG. 2.

In operation 634, the server or the authentication server 620 authenticates the device 610 as the device-server session is generated, and the server or the authentication server 620 may transmit session permission information to the device 610. For example, the session permission information including the session seed key and the expiration date information may be transmitted by the session permission information transmitting unit.

In operation 616, the device 610 generates a device session token by using the received session permission information. The device session token is generated by using its encryption key and the session seed key received from the server 620. The device session token is generated in the same manner as that used to generate the server session token by the authentication server 620, for example, by using a MD5 hash function. Accordingly, the device server session and the server session token must correspond to each other. For example, the device session token may be generated by the device session generating unit 120 of the network communication apparatus 100 of FIG. 1.

In operation 618, the generated device session token is shared by various applications installed in the device 610. The applications may communicate with the server through the device-server session by using the device session token.

Accordingly, if the device 610 including an application having a relatively high security level, such as a device OS or firmware, is authenticated by single-sign-on (SSO), other applications installed in the device 610 do not need to be authenticated individually by the server in order to call content of the server or access the server.

Figure 7:
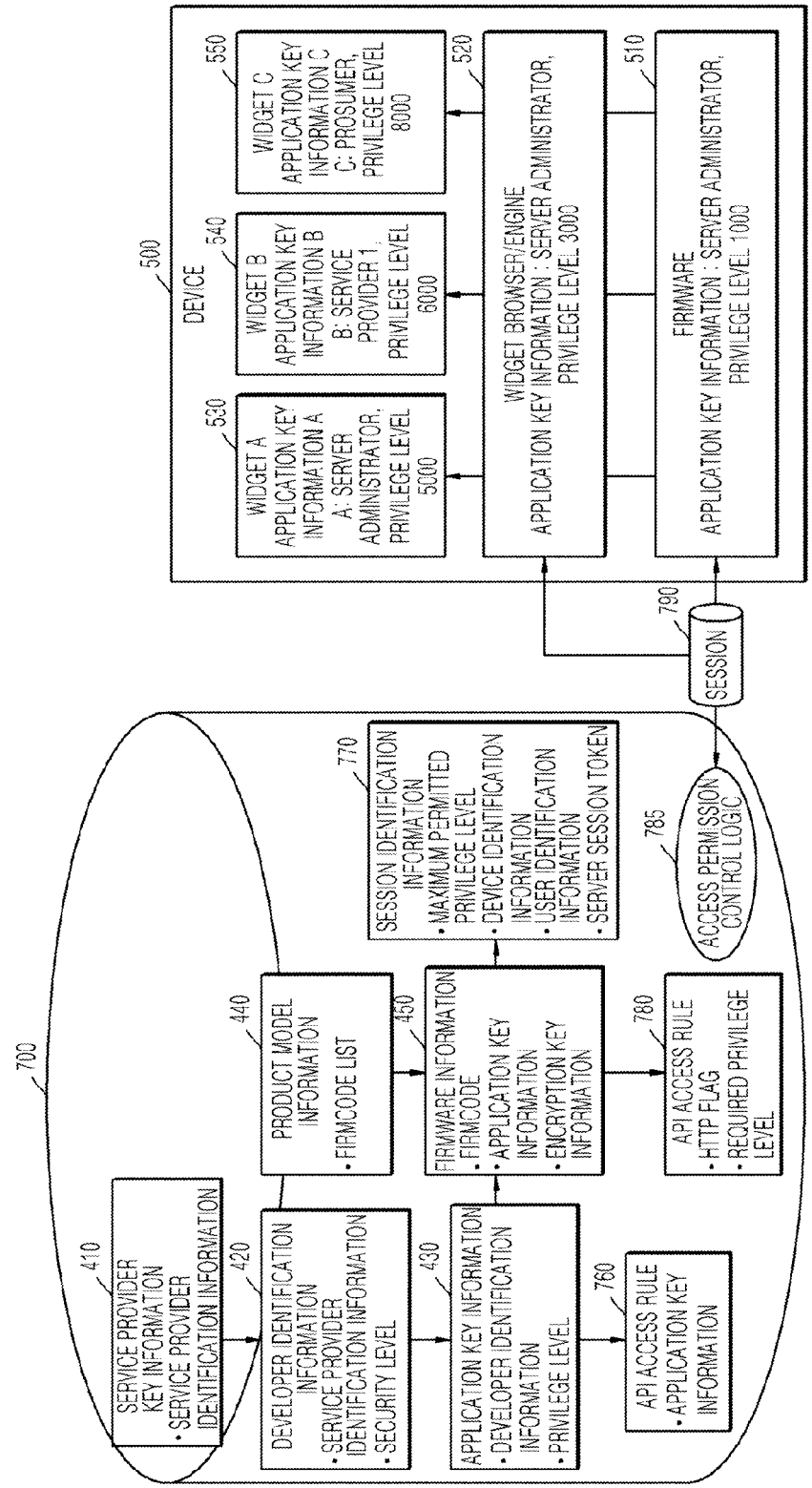
FIG. 7 illustrates a device and a server connected to each other through a device-server session, according to an embodiment of the present invention.

FIG. 7 illustrates a device 500 and a server connected to each other through a device-server session 790, according to an embodiment of the present invention.

Once the device-server session 790 is generated, communication between the device 500 and the server is performed through the device-server session 790. A database 700 of the server corresponding to the database 400 of FIG. 4 may further include widget identification information 760, session identification information 770, information about an API access rule 780, and information about an access permission control logic 785.

The widget identification information 760 may include application key information of a widget, and the session identification information 770 may include a maximum permitted privilege level of the device-server session 790, device identification information, user identification information, and a session token. The information about the API access rule 780 may include information about a required privilege level and information about hypertext transfer protocol (HTTP) flag specified by the server for an API.

Each of the information about the required privilege level and the information about the HTTP flag of the information about the API access rule 780 may be set for each API. The information about the access permission control logic 785 is used to control a method of determining whether the device 500 or an application is permitted to access the server or the database 700 of the server.

The device-server session 790 may be connected to applications of the device 500. A privilege level of an application that can directly generate the device-server session 790 by requesting the server to authenticate the device 500 is limited. For example, the device-server session 790 may be generated by a request from firmware 510 or a firmware browser (engine) 520.

Figure 8:
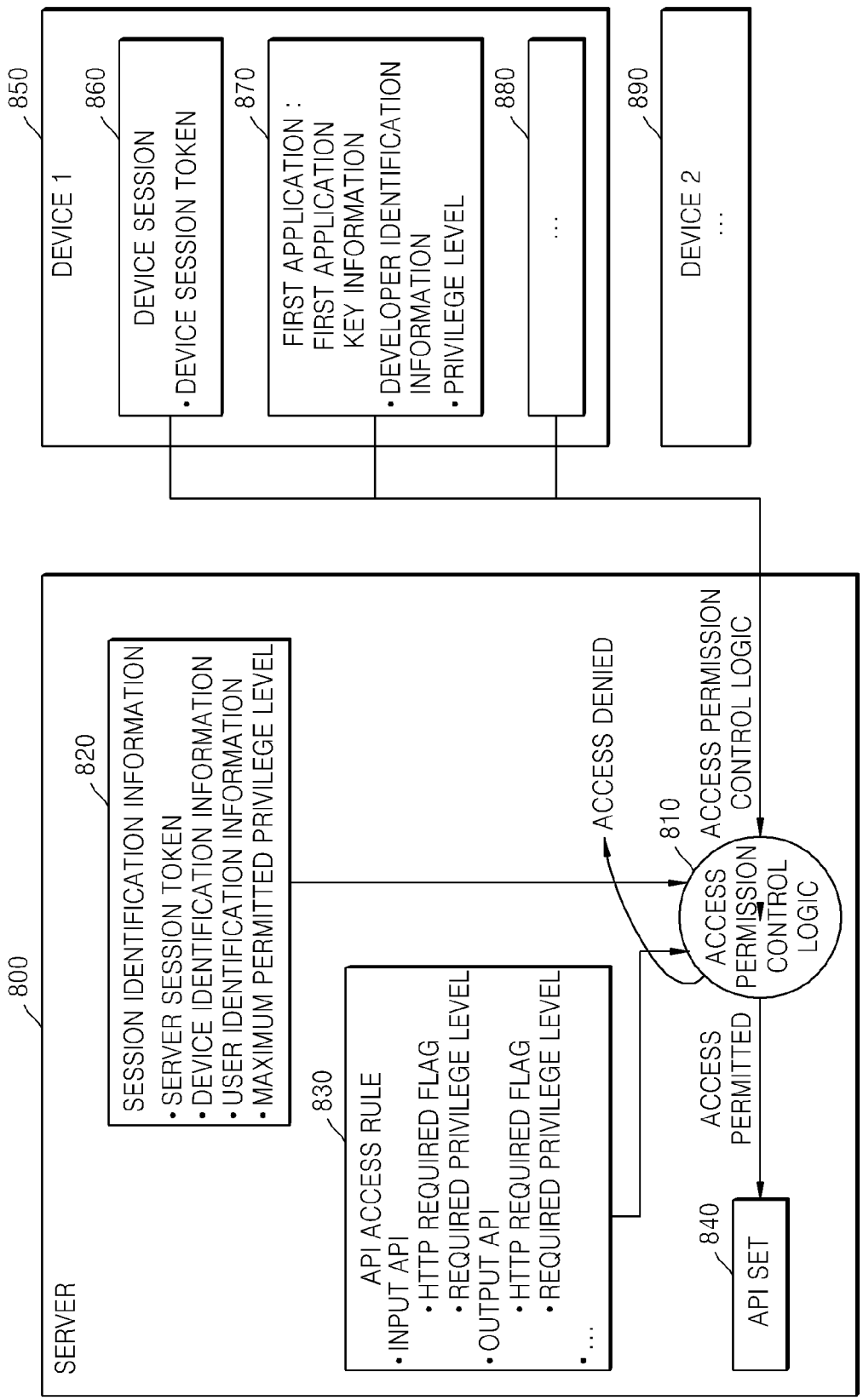
FIG. 8 illustrates access permission control logic of an application of a device, according to an embodiment of the present invention.

FIG. 8 illustrates access permission control logic 810 of an application of a device, according to an embodiment of the present invention.

A server or a database 800 of the server stores information about the access permission control logic 810, session identification information 820, information about an API access rule 830, and information about an API set 840.

The information about the session identification information 820 includes information about a session token of a device-server session, device identification information, and information about a maximum permitted privilege level. If network communication between a device and the server is performed based on device user identification as well as device identification, the session identification information 820 includes user identification information.

The information about the API access rule 830 includes information about a required privilege level and a HTTP required flag for each API. For example, information about an HTTP required flag and a required privilege level are set for each input API, and information about an HTTP required flag and a required privilege level are set for each output API.

The information about the API set 840 includes information about a plurality of APIs required to provide service content of the device. For example, the API set may be an open API set to which not only a server administrator but also an external entity may be connected.

A device 1 850 may include one or more devices, and if an access request of an application exists, the access permission control logic 810 determines whether the access of the application to the API set 840 is permitted by using a device session token and a privilege level of the application.

For example, the access permission control logic 810 receives an access request from a first application of the device 1 850. The first application requests to access the API set 840 of the server by using first application key information 870, a device session token of a device session 860, and other access request information 880. For example, access of the first application to the API set 840 may be requested by the API access requesting unit of the application access requesting unit 130 of the network communication apparatus 100 of FIG. 1.

For example, the request of the first application to access a desired API may be received by the API access request receiving unit of the application access request receiving unit 220 of the network communication apparatus 200 of FIG. 2. The application may access data and content of the server by using the desired API. For example, a widget application showing weather information calls an output API with respect to weather information of the server. Or, an application may call an API, which outputs profile information about a user of the server and the device, in order to use information of the device or the user.

If the received device session token of the device session 860 corresponds to a server session token, the information about the maximum permitted privilege level of the session identification information 820 is transmitted to the access permission control logic 810. Also, a privilege level assigned to the first application which is stored in the database 800 of the server is searched for by the application privilege level searching unit by using the first application key information 870 that is received from the first application, and is transmitted to the access permission control logic 810. A required privilege level of the API access rule 830 with respect to the desired API which the first application requests is transmitted to the access permission control logic 810.

For example, the access permission control logic 810 determines whether the first application is permitted to access the desired API by comparing the maximum permitted privilege level of the session identification information, information about a privilege level of the first application key information 870, and a required privilege level by the API access rule 830 with respect to the desired API.

For example, if a higher privilege level of the maximum permitted privilege level of the session identification information 820 and the privilege level information of the first application key information 870 is higher than or equal to the required privilege level of the desired API, the API access permission determining unit of the application access permission determining unit 240 of the network communication apparatus 200 of FIG. 2 permits the first application to access the desired API. On the contrary, if the higher privilege level of the maximum permitted privilege level of the session identification information 820 and the privilege level information of the first application key information 870 is lower than the required privilege level of the desired API, access is denied.

Since the open API set 840 is shared by entities of the network, such as the server, the device 1, service providers, and a third party such as an individual user, a server load can be balanced, a network bandwidth can be reduced, and user interaction can be simplified. Also, since a modular design, an expandable interface, and existing standards can be utilized, a design change (scalability) can be easily made.

Figure 9:
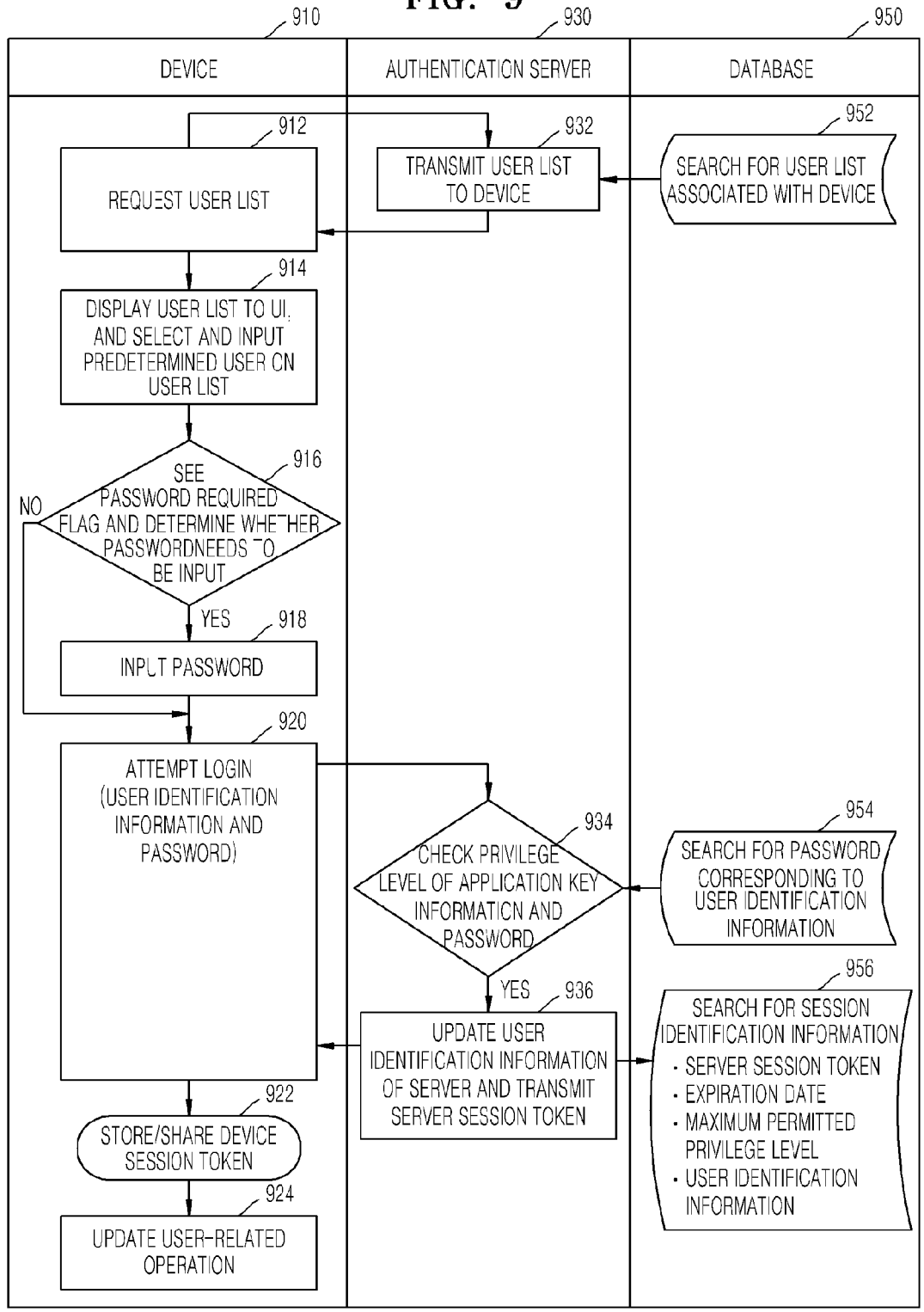
FIG. 9 is a flowchart illustrating a method of generating a device-server session, according to an embodiment of the present invention.

FIG. 9 is a flowchart illustrating a method of generating a device-server session, according to an embodiment of the present invention.

Network communication may be performed by identifying and processing not only devices but also users using the devices according to another embodiment of each of the network communication apparatus 100 or 200.

In operation 912, a device 910 requests a server or an authentication server 930 for a user list of registered devices. In operation 952, the authentication server 930 searches for the user list in a database 950 of the server. In operation 932, the authentication server 930 transmits the searched user list to the device 910.

In operation 914, the device 910 displays the received user list to a user interface (UI), and a user selects and inputs a predetermined user on the user list. In operation 916, the user sees a password required flag and determines whether a password needs to be input for login. If it is determined in operation 916 that the password does not need to be input, the network communication method proceeds to operation 920 in which login is attempted. If it is determined in operation 916, however, that the password needs to be input, the network communication method proceeds to operation 918. In operation 918, the password is input. The device 910 transmits user identification information and the password to the server in order to attempt login. The password may be PIN information.

In operation 934, the authentication server 930 determines whether the login is possible for user authentication by checking the password and a privilege level of key information of an application. In operation 954, a password corresponding to user identification information stored in the database 950 of the server is searched for. It is determined whether login is possible with only the password of the device 910.

In operation 956, the authentication server 930 searches for session identification information in the database 950. In operation 936, the authentication server 930 updates user identification information related to the session identification information, and transmits a server session token to the device 910.

In operation 922, the device 910 generates, stores and shares a device session token. In operation 924, a user related operation is updated, for example, a widget is reloaded according to a user change.

Figure 10:
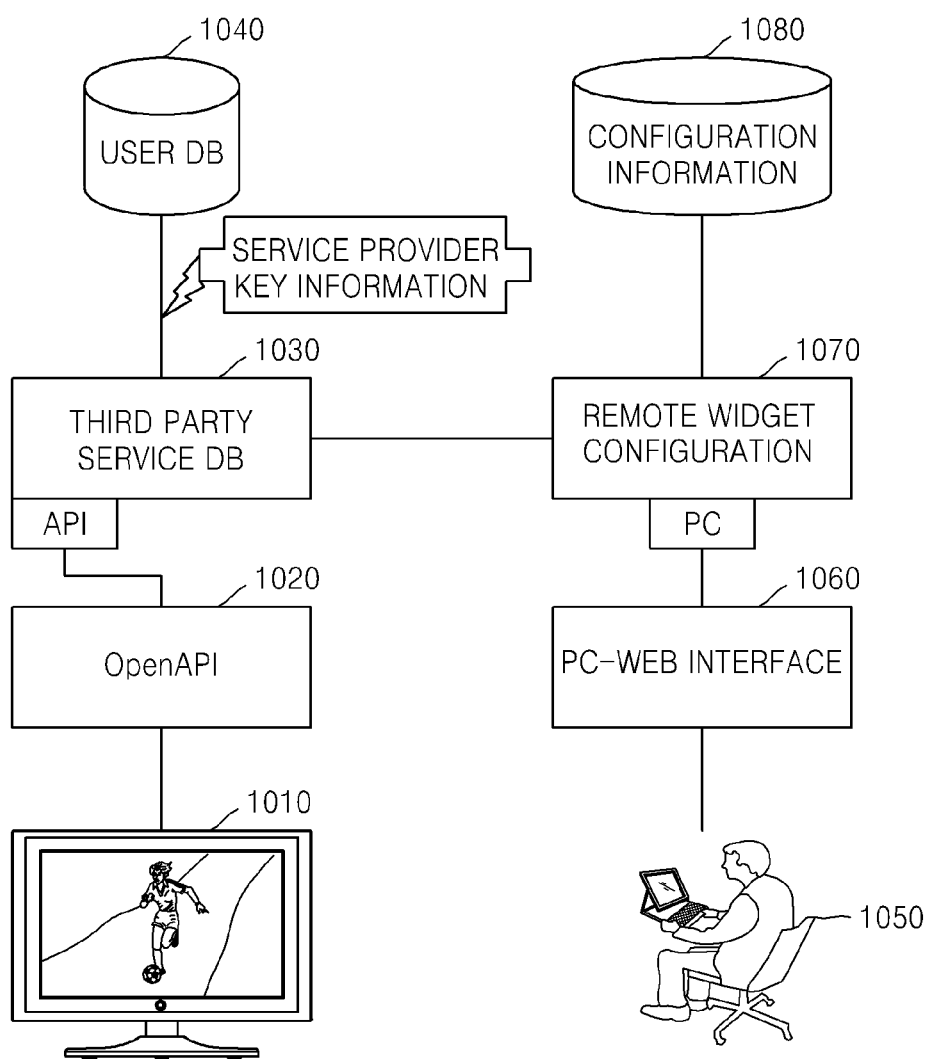
FIG. 10 illustrates a method of accessing a user database, according to an embodiment of the present invention.

FIG. 10 illustrates a method of accessing a user database, according to an embodiment of the present invention.

A local user 1010 of a device accesses a service database 1030 of a third party by using an open API 1020. For example, SSO may be applied to the service database 1030 of the third party. If service provider key information and user identification information are provided from the service database 1030 of the third party, the local user 1010 of the device may access a user database 1040 including information about each user.

A remote user 1050 may change and manage configuration information 1080 of the server by executing a remote widget configuration 1070 on a PC by using a PC-web interface 1060. Also, the remote user 1050 may access the service database 1030 of the third party by using the remote widget configuration 1070, and if desired user identification information and service provider key information are provided, the remote user 1050 may access the user database 1040.

FIG. 11 is a flowchart illustrating a network communication method of a server with a device, according to an embodiment of the present invention.

In operation 1110, the device requests the server to authenticate the device in order to access the server over a network. The device may provide information related to the device by transmitting session request information to the server. For example, since communication between the device and the server is performed based on device identification, only device identification information is transmitted as the session request information. Also, in a network environment also considering a user of the device, the communication may be performed by using user identification information as well as the device identification. In this case, the device may request the server for a user list.

In operation 1120, the device generates a device-server session for the communication between the server and the device based on the authentication of the device by the server. The device generates a device session token by using a seed key received from the server and an encryption key of the device, and the generated device session token is shared by applications of the device.

In operation 1130, a first application installed in the device requests access to the server through the device-server session. The device-server session may be used by transmitting the device session token of the first application to the server, and application key information is provided to the server.

In operation 1140, if the access of the first application is permitted by the server based on a privilege level of the first application, the first application receives requested content from the server. According to a result obtained by comparing a privilege level required by an API or content requested by the first application, a privilege level of the first application, and a maximum permitted privilege level of the device-server session, whether to permit the first application to access the API or content is determined.

FIG. 12 is a flowchart illustrating a network communication method of a device, which is used to communicate with a server, according to an embodiment of the present invention.

In operation 1210, the server receives an authentication request from the device. The server receives session request information from an application of the device, and determines whether the application is authenticated.

In operation 1220, the server generates a device-server session for communication between the server and the device based on the authentication request of the device. The server generates a session seed key and a server encryption key, and generates a server session token by using the session seed key and the server encryption key. Session identification information according to the generated server session token is stored in a database. Information about an expiration date of the application and the session seed key is transmitted to the device.

In operation 1230, the server receives an access request from a first application installed in the device, through the device-server session. The server determines whether the access of the first application is valid by determining whether a device session token transmitted by the device corresponds to the server session token. The server receives a call to a predetermined API of an open API set of the server from the first application.

In operation 1240, the server determines whether the first application is permitted access, based on a privilege level of the first application. A privilege level of an application related to application key information stored in the database of the server is searched for by using the application key information. Whether the first application is permitted access to the predetermined API is determined by comparing a privilege level of the first application, a maximum permitted privilege level related to session identification information, and a required privilege level of the predetermined API.

In operation 1250, the server provides content requested by the first application if it is determined that the first application is permitted access. The application accesses the called API and acquires desired data or content.

As described above, since multi security levels of devices and applications for network communication can be handled, a network communication method and apparatus according to the present invention can be robust to potential threats and attacks.

The present invention may be embodied as computer-readable codes on a computer-readable recording medium. The computer-readable recording medium is any data storage device that can store data which can be thereafter read by a computer system. Examples of the computer-readable recording medium include read-only memories (ROMs), random-access memories (RAMs), CD-ROMs, magnetic tapes, floppy disks, and optical data storage devices. In other exemplary embodiments, the computer-readable recording medium may include carrier waves (such as data transmission through the Internet).

While the present invention has been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A network communication method of a device in which at least two applications including a first application and a second application, are installed, with a server, the network communication method comprising:
   requesting by the second application, the server to authenticate the device in an authentication;
   generating a device-server session for communication between the server and the device based on the authentication of the device by the server;
   requesting by the first application, access to the server through the device-server session; and
   receiving content from the server based on the first application accessing the server, if permission for the first application to access the server is obtained, based on a privilege level of the first application,
   wherein:
   the at least two applications have different privilege levels, and the privilege levels are related with security levels to authenticate the at least two applications in the device,
   the at least two applications receive key information provided by the server, and
   the key information comprises identification information about developers of the at least two applications.

2. The network communication method of claim 1, wherein the privilege levels are assigned by the server to the at least two applications based on functions of the at least two applications and developers of the at least two applications.

3. The network communication method of claim 2, wherein the requesting by the second application, the server to authenticate the device comprises:
   requesting the server to authenticate the device by using the second application installed in the device; and
   transmitting session request information comprising key information of the second application and device identification information.

4. The network communication method of claim 3, wherein the generating of the device-server session comprises:

receiving session permission information comprising a session seed key from the server, based on the session request information; and generating a device session token by using the received session seed key and an encryption key of the device, wherein the device session token is shared by the at least two applications, and if the device session token corresponds to a server session token of the server, the first application is permitted to access the server through the device-server session.

5. The network communication method of claim 4, wherein the requesting by the first application, access to the server comprises requesting access to the server through the device-server session by using the device session token.

6. The network communication method of claim 4, wherein in the receiving of the content comprises, if a higher privilege level of a privilege level of the first application and a maximum permitted privilege level of the device-server session is higher than or equal to a required privilege level of the requested content, it is determined that the content is to be received and the requested content is received from the server.

7. The network communication method of claim 4, wherein the requesting by the first application, access to the server comprises requesting access to a predetermined application programming interface (API) of the server, wherein the receiving of the content comprises:
if a higher privilege level of a privilege level of the first application and a maximum permitted privilege level of the device-server session is higher than or equal to a required privilege level of the predetermined API, obtaining permission for the first application to access the predetermined API; and
receiving the content based on an attribute of the device by using the predetermined API.

8. The network communication method of claim 1, wherein the receiving of the content comprises receiving the content based on an attribute of the device from the server through the device-server session, wherein the first application receives the content.

9. The network communication method of claim 1, wherein the requesting by the second application, the server to authenticate the device comprises requesting the server to authenticate the device based on a user of the device by using user identification information of the user, wherein the generating of the device-server session comprises generating the device-server session based on the user identification information,
wherein the user identification information is at least one of user identification information stored in the device and user identification information of the device which is received from the server.

10. The network communication method of claim 9, wherein the requesting by the first application, access to the server comprises requesting access to a user database of the server through the device-server session, wherein the receiving of the content comprises obtaining permission for the first application to access the user database of the server and receiving predetermined content, based on a privilege level of the first application, the user identification information, and service provider key information of the first application.

11. The network communication method of claim 10, wherein the requesting by the first application, access to the server comprises:

remotely accessing the device through a web interface by using web identification information of the device; and requesting access to the user database of the server through the device-server session by using the web interface.

12. A network communication method of a server, which is used to communicate with a device in which at least two applications are installed, the network communication method comprising:

receiving an authentication request of a second application installed in the device which requests the server to authenticate the device in an authentication;

generating a device-server session for communication between the server and the device based on the authentication of the device by the server;

receiving an access request of a first application installed in the device which requests access to the server through the device-server session; and providing content requested by the first application based on the first application accessing the server, if it is determined that the content is to be provided, wherein the providing of the content comprises:
determining whether the first application is permitted to access the server, based on a privilege level of the first application; and
providing content requested by the first application, based on a result of the determining whether the first application is permitted to access the server, and wherein the at least two applications have different privilege levels, and the privilege levels are related with security levels to authenticate the at least two applications in the device,
wherein the method further comprises providing key information to the respective at least two applications, and
the key information comprises identification information about developers of the at least two applications.

13. The network communication method of claim 12, further comprising assigning the privilege levels to the at least two applications installed in the device based on functions of the at least two applications and developers of the at least two applications.

14. The network communication method of claim 13, wherein the key information comprises privilege levels of the at least two applications and developer identification information of the at least two applications.

15. The network communication method of claim 14, wherein the receiving of the authentication request comprises:

receiving the authentication request of the device from the second application installed in the device; and receiving session request information comprising at least one of key information of the second application, version information of the second application, and device identification information.

16. The network communication method of claim 15, wherein the generating of the device-server session comprises:

determining an encryption key of the server by using the version information of the second application;

generating a session seed key for the device-server session; and generating a server session token by using the session seed key and the encryption key of the server.

17. The network communication method of claim 16, wherein the providing of the content comprises:

comparing a device session token of the first application with the server session token; and determining whether the first application is permitted access through the device-server session, based on a result of the comparing, wherein the device session token of the first application is generated by using the session seed key and an encryption key of the device from session permission information received by the device, and is shared by the at least two applications of the device.

18. The network communication method of claim 17, wherein the generating of the device-server session comprises searching for a privilege level of the first application based on key information of the first application,
wherein the determining of whether the first application is permitted to access the server comprises, if a higher privilege level of a privilege level of the first application and a maximum permitted privilege level of the device-server session is higher than or equal to a required privilege level of the requested content, permitting the first application access.

19. The network communication method of claim 18, wherein the receiving of the access request comprises receiving a request from the first application to access a predetermined application programming interface (API) of the server,
wherein the generating of the device-server session comprises searching for a privilege level of the first application based on the key information of the first application,
wherein the determining of whether the first application is permitted access comprises, if a higher privilege level of a privilege level of the first application and a maximum permitted privilege level of the device-server session is higher than or equal to a required privilege level of the predetermined API, permitting the first application access to the predetermined API.

20. The network communication method of claim 14, wherein the generating of the device-server session comprises generating the device-server session based on user identification information of the device,
wherein the receiving of the access request comprises receiving a request from the first application to access a user database of the server through the device-server session,
wherein the determining of whether the access is permitted comprises permitting the first application to access the user database of the server, based on a privilege level of the first application, the user identification information, and service provider key information of the first application,
wherein the request from the first application to access the user database of the server is at least one of a direct access request through the device and a remote access request using a web interface.

21. A network communication apparatus of a device, which is used to communicate with a server, wherein at least two applications are installed in the device, the network communication apparatus comprising:
a device authentication requesting unit through which a second application installed in the device requests the server to authenticate the device in an authentication;
a device session generating unit which generates a device-server session for communication between the server and the device based on authentication by the server;
an application access requesting unit through which a first application installed in the device requests access to the server through the device-server session; and
a content receiving unit which obtains permission for the first application to access the server, based on a privilege level of the first application, and receives content from the server based on the first application accessing the server, wherein the at least two applications have different privilege levels, and the privilege levels are related with security levels to authenticate the at least two applications in the device,
wherein the at least two applications receive key information provided by the server, and
the key information comprises identification information about developers of the at least two applications.

22. A network communication apparatus of a server, which is used to communicate with a device in which at least two applications are installed, the network communication apparatus comprising:
a device authentication request receiving unit which receives an authentication request from a second application installed in the device which requests the server to authenticate the device in an authentication;
a server session generating unit which generates a device-server session for communication between the server and the device based on the authentication of the device by the server;
an application access request receiving unit which receives an access request from a first application installed in the device which requests access to the server through the device-server session; and
a content providing unit which determines whether the first application is permitted to access the server, based on a privilege level of the first application, and provides content requested by the first application based on the first application being permitted to access the server, and wherein the at least two applications have different privilege levels, and the privilege levels are related with security levels to authenticate the at least two applications in the device,
wherein the apparatus of the server further comprises an application key information providing unit that provides key information to the at least two applications, and
the key information comprises identification information about developers of the at least two applications.

23. A non-transitory computer-readable recording medium having embodied thereon a program for executing a network communication method of a device, which is used to communicate with a server, wherein at least two applications including a first application and a second application, are installed in the device and the network communication method comprises:
requesting by the second application, the server to authenticate the device in an authentication;
generating a device-server session for communication between the server and the device based on authentication of the device by the server;
requesting by the first application, access to the server through the device-server session; and
receiving content from the server based on the first application accessing the server, if permission for the first application to access the server is obtained, based on a privilege level of the first application,
wherein the at least two applications have different privilege levels, and the privilege levels are related with security levels to authenticate the at least two applications in the device,
the at least two applications receive key information provided by the server, and
the key information comprises identification information about developers of the at least two applications.

24. A non-transitory computer-readable recording medium having embodied thereon a program for executing a network communication method of a server, which is used to communicate with a device in which at least two applications are installed, wherein the network communication method comprises:

receiving an authentication request of a second application installed in the device which requests the server to authenticate the device in an authentication;

generating a device-server session for communication between the server and the device based on the authentication of the device by the server;

receiving an access request from a first application installed in the device which requests access to the server through the device-server session; and providing content requested by the first application based on the first application accessing the server, if it is determined that the content is to be provided, wherein the providing of the content comprises:

determining whether the first application is permitted to access the server, based on a privilege level of the first application; and providing content requested by the first application, based on a result of the determining whether the first application is permitted to access the server, wherein the at least two applications have different privilege levels, and the privilege levels are related with security levels to authenticate the at least two applications in the device, wherein the method further comprises providing key information to the respective at least two applications, and the key information comprises identification information about developers of the at least two applications.

25. A network communication method of a device, which is used to communicate with a server, wherein at least two applications are installed in the device, the network communication method comprising:

generating a session for communication between the server and the device by using a second application installed in the device;

having a first application installed in the device to use the session based on a privilege level of the first application; and receiving predetermined content from the server based on the privilege level of the first application accessing the server by using the session, wherein:

privilege levels of the at least two applications are rights reserved by the at least two applications to access the server, the at least two applications have different privilege levels, and the privilege levels are related with security levels to authenticate the at least two applications in the device, the at least two applications receive key information provided by the server, and the key information comprises identification information about developers of the at least two applications.

26. The network communication method of claim 25, wherein the generating of the session comprises generating the session based on a privilege level of the second application that requests the server to authenticate the device.

27. A network communication method of a server, which is used to communicate with a device in which at least two applications are installed, the network communication method comprising:

generating a session for communication between the server and the device by using a second application installed in the device;

receiving an access request of a first application installed in the device which requests access to the server through the session, based on a privilege level of the first application; and determining whether predetermined content is provided to the first application based on the privilege level of the first application, wherein privilege levels of the at least two applications are rights reserved by the at least two applications to access the server, wherein the at least two applications have different privilege levels, and the privilege levels are related with security levels to authenticate the at least two applications in the device, and wherein the method further comprises providing key information to the respective at least two applications, and the key information comprises identification information about developers of the at least two applications.

28. The network communication method of claim 27, wherein the generating of the session comprises generating the session based on a privilege level of the second application that requests the server to authenticate the device.

29. A network communication method of a device, which is used to communicate with a server, wherein at least two applications are installed in the device, the network communication method comprising:

generating a token for a second application installed in the device to access the server;

sharing the generated token with the at least two applications; requesting access of a first application, which is installed in the device, to the server by using the shared token; and receiving content requested by the first application from the server based on the first application accessing the server, wherein:

the receiving of the content comprises obtaining permission for the first application to access the server, based on a privilege level of the first application, the at least two applications have different privilege levels, and the privilege levels are related with security levels to authenticate the at least two applications in the device, the at least two applications receive key information provided by the server, and the key information comprises identification information about developers of the at least two applications.

30. The network communication method of claim 29, wherein the generating of the token comprises:

requesting by the second application, the server to authenticate the device; and generating a token indicating that the device authenticated by the server accesses the server.

31. The network communication method of claim 30, wherein privilege levels are rights reserved by the at least two applications to access the server, and different privilege levels are assigned by the server to the at least two applications.

32. A network communication method of a device, which is used to communicate with a server, wherein at least two applications are installed in the device, the network communication method comprising:

generating a session for communication between the server and the device by using a second application installed in the device;

having a first application installed in the device to use the session based on key information of the first application; and receiving predetermined content from the server based on the key information of the first application that accesses the server by using the session, wherein:

application key information of the first application corresponds to a privilege level of the first application, and privilege levels of the at least two applications are rights reserved by the at least two applications to access the server, the at least two applications have different privilege levels, and the privilege levels are related with security levels to authenticate the at least two applications in the device, and the at least two applications receive key information provided by the server, and the key information comprises identification information about developers of the at least two applications.

33. The network communication method of claim 32, wherein the key information and the privilege levels are assigned by the server to the at least two applications.

34. The network communication method of claim 32, wherein the generating of the session comprises generating the session based on key information of the second application that requests the server to authenticate the device.

35. A network communication method of a server, which is used to communicate with a device in which at least two applications are installed, the network communication method comprising:

generating a session for communication between the server and the device based on key information of a second application installed in the device;

receiving an access request of a first application installed in the device which requests access to the server through key information of the first application; and determining whether predetermined content is provided to the first application based on the key information of the first application, wherein key information of the first and the second applications correspond to privilege levels of the first and the second applications, and the privilege levels of the first and the second applications are rights reserved by the first and the second applications to access the server, wherein the at least two applications have different privilege levels, and the privilege levels are related with security levels to authenticate the at least two applications in the device, and wherein the method further comprises providing key information to the respective at least two applications, and the key information comprises identification information about developers of the at least two applications.

36. The network communication method of claim 35, wherein the key information of the first and the second applications and the privilege levels are assigned by the server to the first and the second applications.

37. The network communication method of claim 35, wherein the generating of the session comprises generating the session based on the key information of the second application that requests the server to authenticate the device.

* * * * *